Fig. 2.

United States Patent Office 2,805,038
Patented Sept. 3, 1957

2,805,038
PRESSURE ACTUATED BYE-PASS VALVES

Frank Hathorn Towler, Rodley, and John Maurice Towler, Dob Park, near Otley, England, assignors to Electraulic Presses Limited, Rodley, England, a limited liability company Application December 4, 1952, Serial No. 324,104

Claims priority, application Great Britain December 7, 1951

7 Claims. (Cl. 251—28)

This invention relates to by-pass valves of the type in which fluid flow between inlet and outlet ports is controlled by an axially movable valve member or spindle, and it is more particularly concerned with by-pass valves in which the positioning of the movable valve member is controlled by pressure fluid supplied from a source other than that of the fluid by-passed by the valve.

One object of the invention is to provide a valve of the above general character in which the positioning of the movable valve member is determined by the rate of flow of pilot pressure fluid supplied to the valve.

A more specific object is to provide a pilot pressure fluid operated by-pass valve that can be controlled by a very simple pilot valve having only two operative positions, namely, open and closed positions, effective to initiate or interrupt the flow of pilot pressure fluid to the by-pass valve.

Another object is to provide a by-pass valve in which the rate of movement of the movable valve member is not materially affected by variations in the pressure of the fluid controlled by the valve.

One object is to provide a valve having a member movable in one direction by a piston acted on by pilot pressure fluid and in the opposite direction by a spring and embodying means for restricting the movement of the member by the spring.

Still another object is to provide a pilot pressure fluid operated by-pass valve adapted to fail "safe," that is, to open upon interruption of the supply of pilot pressure fluid.

Other objects and advantages of the invention will become apparent from the following detailed description of the preferred embodiments illustrated in the accompanying drawings.

In order that the invention may be clearly understood and carried into effect several examples of by-pass valves according to the present invention and the manner in which a series of the same may be used for loading and unloading an equivalent number of pumps in series will now be described by aid of the accompanying drawings in which.

Like parts throughout the views in the accompanying drawings will be denoted by like reference numerals.

Figure 1:
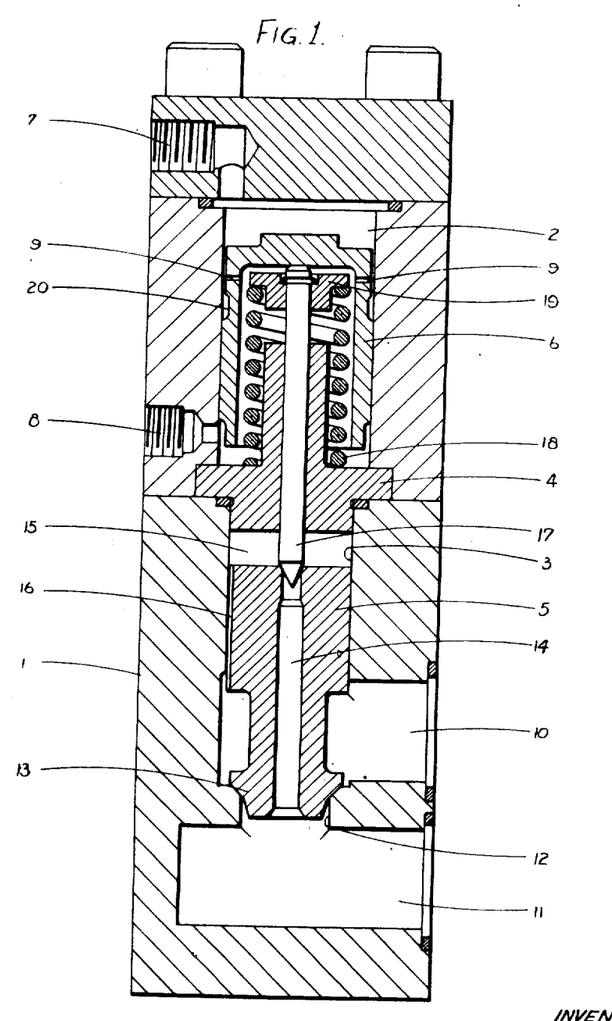
Fig. 1 is a vertical section through one form of by-pass valve in which pilot pressure is admitted to the outer side of the piston and exhausted from the inner side of the piston.

The valve illustrated in Fig. 1 of the drawings comprises a valve body 1, having a bore within the interior of the valve body which is divided laterally into two portions or chambers 2 and 3 by a guide member 4, the portion 2 forming a hydraulic cylinder for pilot pressure liquid and the other portion 3 a bore proper for the slidable reception of a primary valve member 5. Within the hydraulic cylinder 2 is disposed a piston 6 for reciprocating movement therein, the pilot pressure liquid entering the cylinder 2 on one side of this piston 6 through an inlet 7 and exhausting from the opposite side of the piston through an outlet 8 by way of one or more permanently open ports or passages 9 of restricted area in the piston which serves to regulate the position of the piston 6 and its relative movement in both directions.

An inlet 10 and an outlet 11 in the valve body 1 for primary pressure liquid are connected by a passage 12 which is opened and closed by a head or mitre valve 13 forming part of the valve member 5. Extending through the valve member 5 is a longitudinal passage 14 which allows primary pressure liquid to flow to the outlet 11 from a balancing chamber or space 15 on the opposite side of the valve member 5.

Primary pressure liquid from the inlet 10 obtains an entry into the balancing chamber 15 by way of a permanently open passage 16 of restricted area extending axially of the valve member 5 and its return flow through the longitudinal passage 14 at a greater rate than through the passage 16 is controlled by a needle valve 17 slidable in an axial bore in the guide member 4 and having a tapered end which seats within the opposing end of the passage 14.

The object of the permanently open and restricted passage 16 is to maintain a pressure balance on both sides of the primary valve member 5 until this balance is upset upon the opening of the longitudinal passage 14. The pressure stroke of the piston 6 is opposed by a spring 18 and such spring in this instance serves to move the piston to cause the needle valve to open the passage 14. Upon the upset of the aforesaid pressure balance the primary valve member 5 is forced by the pressure at the inlet 10 to follow the movement of the needle valve and in so doing to open the passage 12.

In the example illustrated in Fig. 1 the pilot pressure liquid is admitted to the cylinder 2 above the piston 6 and the spring 18 is disposed within the piston and seats against a pad 19 on the outer end of the needle valve 17 whereby the same tends to lift the valve 17 from its seat against the opposing pressure on the piston 6.

Again in this example the outer or upper end of the piston 6 is reduced so that there is a clearance of a few thousandths of an inch between this reduced portion and the bore of the cylinder 2. Opening within this clearance are small orifices constituting the aforesaid permanently open ports or passages 9. These extend laterally through the wall of the piston 6 at its reduced end and thereby enable pilot pressure liquid from the space on the outside of the piston to escape at a predetermined rate into the interior of the piston and so out through the outlet 8 to exhaust. The permitted rate of escape through the ports or passages 9 is such as will ensure the maintaining of a pressure on the outside of the piston which will overcome the opposing pressure of the spring 18.

Thus with pilot pressure liquid admitted to the upper end of the cylinder 2 the passage 12 will be closed and upon interrupting the admission of pilot pressure liquid to the cylinder 2 or if such supply fails the spring 18 will carry the needle valve 17 and the piston 6 upwards or outwards at a rate which will be determined by the force of the spring 18 in relation to the combined area of the ports or passage 9.

In consequence of this upward or outward movement of the needle valve the same will be lifted from its seat and allow the pressure within the space 15 to escape through the longitudinal passage 14. As the rate of this escape will be greater than the rate at which liquid can enter the space 15 up the restricted passage 16 the pressure balance on opposite ends of the valve member 5 will be upset and this valve member will accordingly follow the needle valve until they again meet and effect reclosing of the longitudinal passage 14 when the pressure balance will once more be restored. In this new position of the valve member 5 the passage 12 connecting the inlet 10 to the outlet 11 will be opened.

By arranging the ports 9 so that they open into the narrow clearance surrounding the outer or upper end of the piston 6 any large pieces of foreign matter will be prevented from having access to and possibly blocking the ports 9.

It is intended that any such pieces of foreign matter which become lodged in the clearance shall be wiped off by the piston on its upward or outward stroke and to facilitate this a deep annular groove 20 is formed in the piston at the lower end of the reduced portion in order to receive and collect such particles.

The spring 18 is designed to have considerable force in relation to the small force in the same direction which may be applied by pressure acting on the end of the needle valve or pilot spindle which projects into the space 15 so as to ensure that the rate of movement of the pilot spindle shall not be very materially affected by variations of pressure within the body of the by-pass valve and it will be understood that the rate of movement of the valve member 5 will be coincident therewith.

In the embodiment described above, it will be seen that the movement of the by-pass valve member 5 in one direction or both directions may be effected by the pressure of the primary fluid, which flows through and is controlled by the by-pass valve member, acting upon an area of the by-pass valve member, but in all cases the said movement is initiated by the pilot-piston 6 actuated by pilot-pressure and it is controlled by a separate pilot control valve not shown designed to admit or interrupt the admission of pilot-pressure to the pilot-piston. Thus, if pilot-pressure liquid is admitted to the pilot-piston at a sufficient rate, the velocity across the escape orifice 9 will be such as to increase the pressure in the pilot-cylinder so that it overcomes the force of the pilot-spring 18 and forces the pilot-piston downwards, thereby causing the by-pass valve to close; and the rate of closing will be determined by the rate at which pilot-pressure is supplied. On the other hand, if the supply of pilot-pressure is interrupted, the pilot-spring will immediately force the pilot-piston upwards, thereby causing the by-pass valve to open; and the rate of opening will be determined by the area of the pilot-piston in relation to the area of the escape orifice 9 and the force of the pilot-spring. Furthermore, it will be appreciated that the operation of the by-pass valve can be controlled by a very simple pilot-control valve having only two operative positions, open-closed, designed to admit and interrupt the flow of pilot-pressure liquid to the pilot-piston. The flow is unidirectional from pilot-control valve to pilot-piston, and the pipe friction can be taken care of by providing adequate pilot-pressure. Reverse flow is through the orifice 9 within the pilot-piston assembly and therefore not affected by pipe friction and not very materially affected by changes of viscosity of the pilot-pressure liquid. That is to say that the said orifices 9 are located within the pilot-piston or within the pilot-piston assembly, to permit a restricted flow of pilot pressure liquid from one side of the piston to the other, so that displacement of liquid takes place across the pilot-piston when it is moved by the pilot-spring and there is not material displacement along the exhaust pipes except when the pilot piston is being moved downwards, and held at the lower end of its stroke by pilot pressure.

Figure 2:
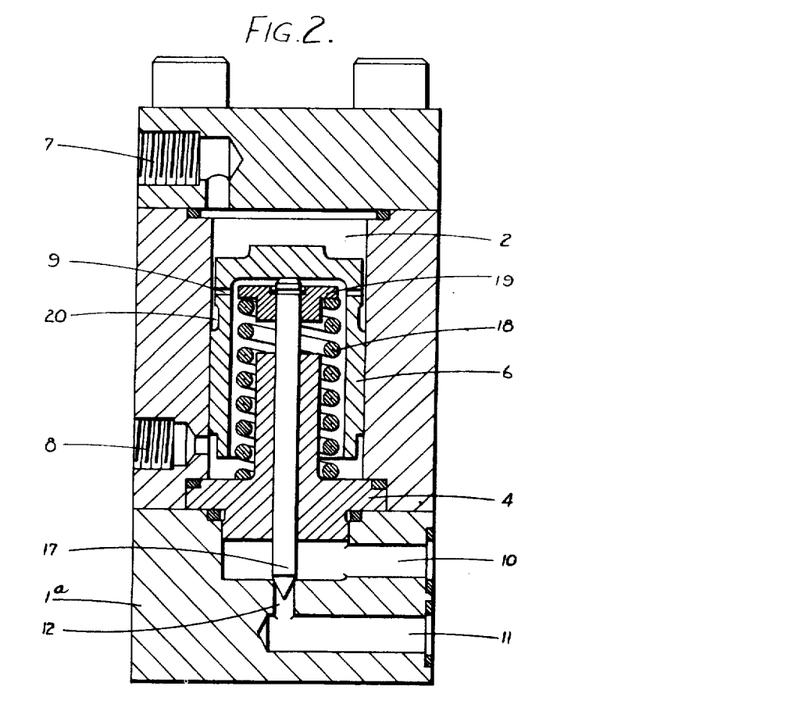
Fig. 2 is a similar view through a simpler form of the valve shown in Fig. 1 in which the valve means consists of a single valve member of the needle type.

The embodiment illustrated in Fig. 2 is generally similar to Fig. 1 with the exception that the needle valve 17 in this instance, performs the functions of the by-pass or main valve member. The valve member 5 is thus dispensed with and the valve body 1ª is reduced substantially in length.

Figure 3:
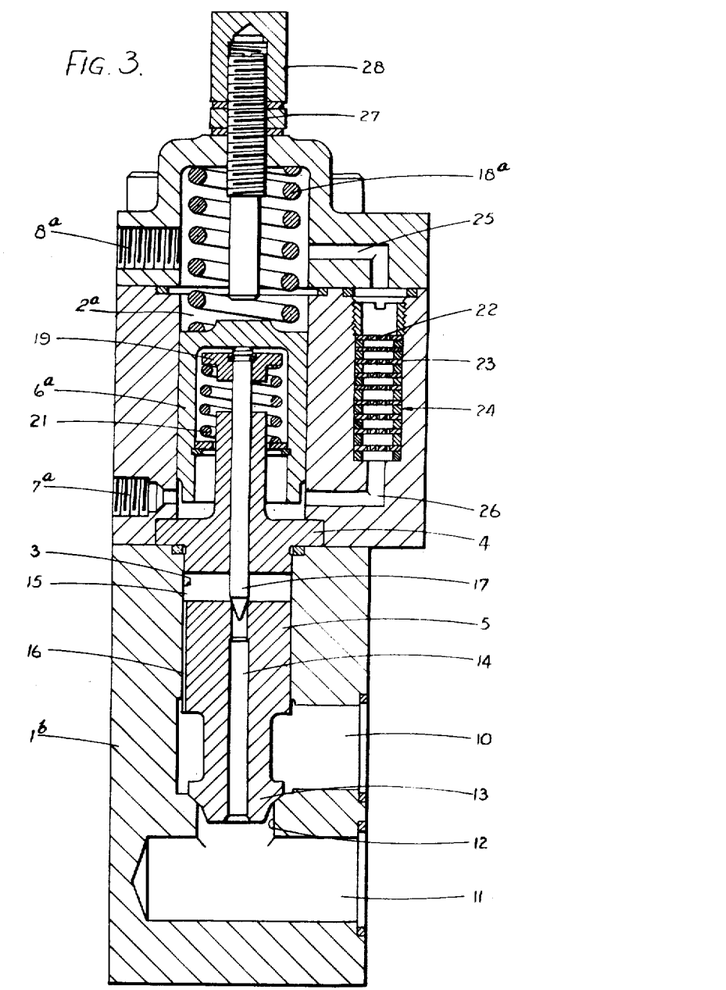
Fig. 3 is a vertical section through a valve similar to that shown in Fig. 1 but in which the pilot pressure is admitted to the inner side of the piston and exhausted from the outer side of the piston.

In the valve assemblies shown in Figs. 1 and 2 the by-pass valve is closed by the pilot-pressure and opened by the spring 18 when the pilot-pressure is interrupted. Fig. 3 shows a sectional elevation of a seated type by-pass valve constructed according to another embodiment of this invention in which the by-pass valve 17 is opened by the pilot-pressure and closed by a spring 18ª when the pilot-pressure is interrupted. In this form of the valve, the body 1ᵇ is divided by the guide member 4 into upper and lower chambers 2ª and 3, the latter accommodating the primary valve member 5 precisely as in the case of the valve of Fig. 1. Chamber 2ª accommodates a piston 6ª controlling the needle valve 17. To accommodate this mode of operation, pilot-pressure is directed through inlet connection 7ª, opening into the chamber 2ª below the piston 6ª. Outlet connection 8ª which is connected to exhaust opens into the upper end of chamber 2ª and consequently, pilot-pressure is operative on the lower or inner side of the piston 6ª in opposition to the pilot spring 18ª which now acts upon the upper side of the piston 6ª. A light spring 21 within the piston 6ª serves to maintain the pilot spindle or needle valve 17 in contact with the piston 6ª so that they move together. Instead of providing the orifice in the piston as in the valves shown in Figs. 1 and 2, in the instant valve orifices 22 in washers 23 are arranged in series within a chamber 24 connecting the upper and lower sides of the piston 6ª by passages 25 and 26. An adjusting screw 27 with locknut 28 limits the opening movement of the valve. Thus, if pilot-pressure is admitted throughout inlet 7ª, the area of the orifice 22 is in such that the pressure on the lower side of the piston 6ª will be sufficient to overcome the force of the pilot-spring 18ª and cause the pilot spindle 17 to move upwards, followed by the by-pass valve member 5, thereby opening the by-pass valve. On the other hand, if the supply of pilot-pressure liquid is interrupted, the pilot-spring 18ª will force piston 6ª and pilot-spindle 17 downwards to close the by-pass valve, the rate of closing being determined by the force of spring 18ª in relation to the number and area of the orifices 22. Fig. 3 shows the by-pass valve closed. The arrangement of orifices in series within the pilot piston assembly, as shown in Fig. 3 may be applied to by-pass valves such as shown in Figs. 1 and 2 without departing from this invention.

According to another embodiment of this invention a by-pass valve may be constructed with pilot-piston assembly similar to that shown in Fig. 3 but with the lower part similar to Fig. 2, in which the pilot spindle 17 constitutes the by-pass valve spindle.

Figure 4:
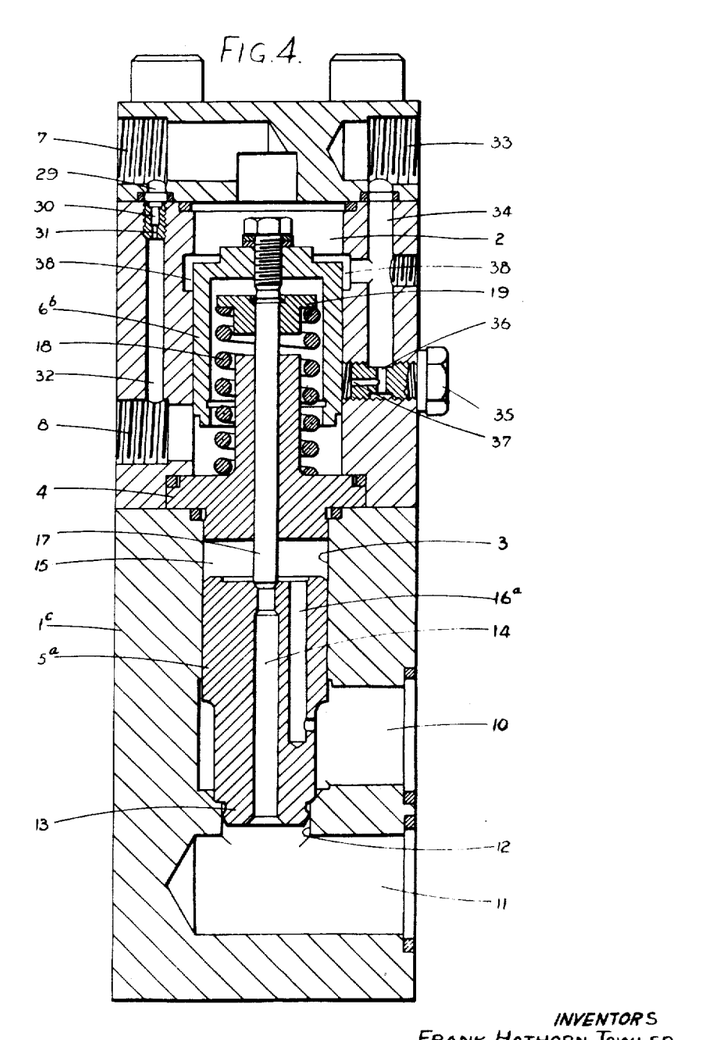
Fig. 4 is a vertical section through a by-pass valve similar to the valve shown in Fig. 1 but modified in a manner hereafter to be described.

The embodiment illustrated in Fig. 4 is a valve similar to that shown in Fig. 1 but modified to enable a number of such valves to be grouped to allow for "sequence control" so that a number of pump units may be loaded and unloaded in sequence and thus eliminate or reduce shock in the exhaust system.

For this purpose the valve as shown in Fig. 4 has a fluid orifice for pilot pressure fluid formed by a drilled hole 29, plug 30, orifice 31, and drilled passage 32. Moreover, the passage 16ª is in the form of a longitudinally extending bore in the body of the bypass valve 5ᵇ.

Operation of the valve shown in Fig. 4 is thus identical with the valve shown in Fig. 1 except that when admission of pilot pressure liquid at 7 is interrupted the piston $6^b$, lifted by spring 18, will displace liquid via orifice 31, and drilled passage 32 to exhaust 8.

Further additions possessed by the valve shown in Fig. 4 when compared with the valve shown in Fig. 1 are a connection 33, drilled passage 34, plug 35, radial holes 36, orifice 37, and annular groove 38.

Figure 6:
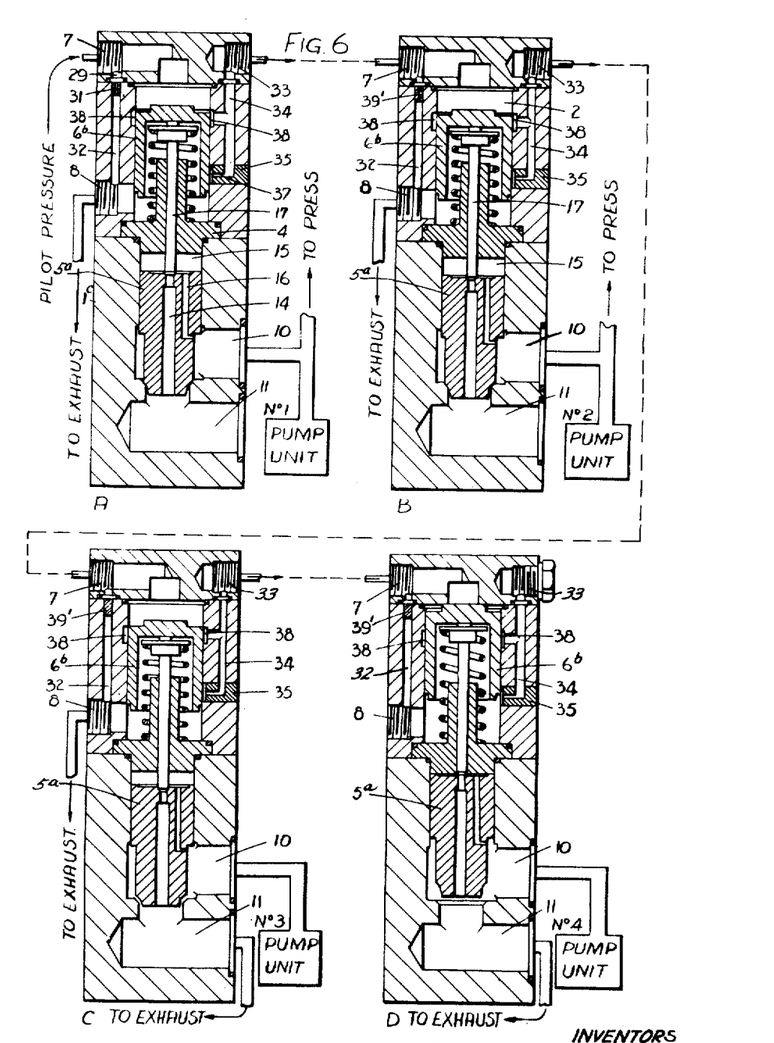
Fig. 6 is a diagram illustrating one manner of using four by-pass valves similar to the one shown in Fig. 4 for loading and unloading in sequence four pumps.

When two or more such by-pass valves are employed in a system for loading or unloading a similar number of pump units, the valves will be connected in the manner shown in Fig. 6. It will be noticed that pilot pressure oil is supplied to connection 7 of valve A, connection 33 of valve A being coupled to 7 of valve B and so on. It will also be noticed that plug 30 incorporating orifice 31 is replaced on valves B, C, D, etc., with a solid plug 39′.

Thus when the pumps are required to be loaded at the commencement of a press cycle, pilot pressure oil will be supplied to 7 of valve A. As described in connection with Fig. 1, this will push the piston $6^b$ downwards, which in turn will close the mitre seat on valve member $5^a$ and load the pump unit controlled by valve A. When the piston $6^b$ has covered the major portion of its stroke, say within $\frac{1}{16}''$ of closing, the upper face of the piston $6^b$ will enter in the annular groove 38. Thus pilot pressure oil can now proceed via annular groove 38, drilled passage 34, connection 33 of by-pass valve A to connection 7 of by-pass valve B. Valve B will now close in exactly the same manner as valve A, and the pump unit controlled by valve B will be brought on to load. Similarly pilot pressure oil is fed in turn to by-pass valve C, and D etc., and all the pumps in the system will be brought in, in sequence, thus eliminating shock waves in the system.

As previously stated, it is equally desirous to unload the pump units in sequence, when the press cycle or part of the cycle has been completed, to avoid shocks in low pressure exhaust lines. As described when pilot pressure oil to the by-pass valve is interrupted, spring 18 will lift the piston $6^b$ and pilot spindle 17, liquid being displaced from the chamber above the piston, through the orifice 31.

The rate of lift, and consequently, the rate of opening of the mitre seated valve member $5^a$, depends upon the load of spring 18, and area of orifice 31.

It will be appreciated that when the mitre seated valve member $5^a$ begins to lift, high pressure pump delivery, connected in at 10, can pass to exhaust via 11.

To achieve this "sequence unloading," the first valve A has an orifice 31 in the plug 30; in the following valves, however, the plug 39′ is solid.

Thus, when the needle valve 17 and piston $6^b$ of the first valve A has lifted approximately $\frac{1}{8}''$, the lower edge or skirt of the piston $6^b$ will commerce to uncover the drilled passage containing the plug 35. This passage is connected by the orifice 37, the radial holes 36 (Fig. 4), drilled passage 34 and connection 33 of valve A to connection 7 of valve B and thence to the chamber above the piston 6 of valve B.

Spring 18 of valve B will now be able to lift the piston $6^b$ and pilot spindle 17 of valve B, displacing liquid from above the piston via the orifice 37 and connection 8 of valve A to exhaust.

Thus, the mitre seated valve member $5^a$ of valve B will begin to lift, and the pump units controlled by valve B will commerce to unload. Similarly, when the piston $6^b$ has lifted approximately $\frac{1}{8}''$, the piston and spindle of valve C will commerce to lift, and the pump units will be unloaded in sequence.

Figure 5:
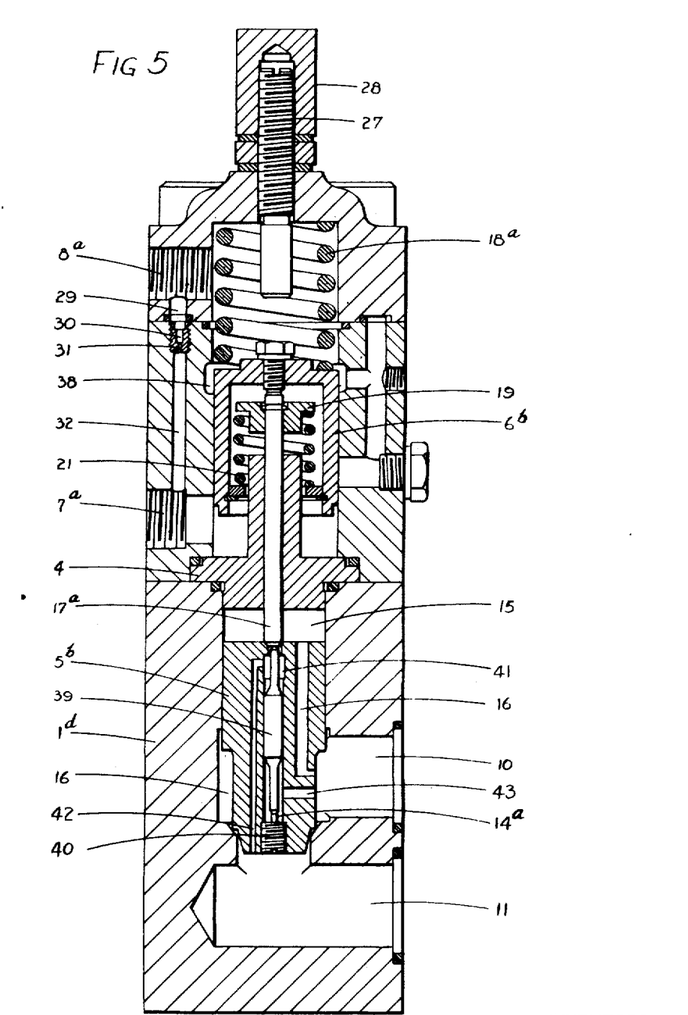
Fig. 5 is a vertical section through a by-pass valve similar to the valve shown in Fig. 3 but modified in a manner hereafter to be described.

A further modification of the valve disclosed in Fig. 3 is shown in Fig. 5.

In the valve shown in Fig. 5, a pilot spindle 39 is slidably mounted in the central bore $14^a$ of mitre seated valve member $5^b$. Plug 40 seals the lower end of the central bore $14^a$, whilst just below the smaller mitre seat at the upper end of valve member $5^b$ is an annular chamber 41 which is connected to exhaust via drilled passage 42. Thus the upper end of spindle 39 and underside of needle valve $17^a$ are continuously exposed to the pressure in the passage 11, usually exhaust, whilst the lower end of pilot spindle 39 is exposed to the high pressure in passage 10 via drilled hole 43.

The pilot spindle 39 is a lap fit in the central bore $14^a$ of valve member $5^b$.

The addition of pilot spindle 39, so mounted improves the behaviour of the valve, when a valve of this type is used as a relief valve.

It will be appreciated that high pressure fluid at the inlet 10 will also be available via drilled passage 43 to the underside of pilot spindle 39. This pressure, acting on the relatively small area of spindle 39, will lift this spindle 39, needle valve $17^a$ and piston $6^b$ against the load of spring $18^a$. It will thus be possible to control large quantities of high pressure fluid with relatively low operating force.

This embodiment can be used, amongst other things, as an admission valve, and also for flow restricting purposes, by admitting pilot pressure supply underneath piston $6^b$ against the load of spring $18^a$. The addition of pilot spindle 39 increases the adaptability of the valve especially for flow restriction purposes, e. g., it is often desirable on down stroking hydraulic presses, that the press tables should fall quickly, but at a controllable speed, until, just before the work is contacted, the tables should be arrested and closure of the dies made slowly. These conditions can be achieved by connecting inlet port 10 to the return cylinders of the press.

Thus, when pilot pressure oil is supplied to connection 7, the piston $6^b$ and mitre seated valve member $5^b$, will lift an amount controlled by adjusting screw 27. The press table will fall freely, at controlled speed, displacing liquid from the return cylinder via ports 10 and 11.

At some point before the work is contacted, pilot pressure oil is interrupted, spring $18^a$ will push the piston $6^b$ downwards, displacing liquid from the chamber underneath the piston to exhaust via orifice 31. Thus the mitre seated valve member $5^b$ will tend to close, and the pressure in the return cylinders will rise, due to liquid being pumped into the main cylinders. When the pressure in the return cylinders has risen to balance the ratio of the area of spindle 39 and load of spring $18^a$, spindle 39 will lift sufficiently to allow the mitre seated valve member $5^b$ to lift slightly, and oil from the return cylinders will be displaced at this pressure.

Thus, when pilot supply to the valve is interrupted, falling of the press tables due to gravity will be arrested, and the remainder of the stroke will be achieved by pumping the tables down.

What is claimed is:

1. The combination with a valve having a member movable between two positions respectively effective to open and close a by-pass for a source of pressure fluid, of a pilot control for said valve comprising a pilot valve operable to control the application of pressure from said source to one end of the valve member to effect its movement selectively in either direction, actuating means for said pilot valve operable from a second source of pressure fluid independent of said first-mentioned source, said actuating means including a casing defining a cylinder, a piston slidable in said cylinder and positioned to act on said pilot valve, spring means urging the pilot valve and piston toward one end of said cylinder, said cylinder having an inlet port adjacent said one end for introduction of pressure fluid from said second source and an outlet port adjacent its other end for venting fluid from the cylinder, a continuous passage in said pilot valve connecting said ports, said passage having an orifice therein dimensioned so as to restrict the flow of pilot pressure fluid to cause a build-up pressure in said one end of the cylinder sufficient to shift the piston and said pilot valve to an advanced position, said spring means acting to shift the piston and said pilot valve to retracted position upon interruption of the flow of pressure fluid through said inlet port.

2. The combination with a valve having a member movable between two positions respectively effective to open and close a by-pass for a source of pressure fluid, of a pilot control for said valve comprising a pilot valve operable to control the application of pressure from said source to one end of the valve member to effect its movement selectively in either direction, actuating means for said pilot valve operable from a second source of pressure fluid independent of said first mentioned source, said actuating means including a casing defining a cylinder a piston slidable in said cylinder and positioned to act on said pilot valve, spring means urging the pilot valve and piston toward one end of said cylinder, said cylinder having an inlet port adjacent said one end for introduction of pressure fluid from said second source, and an outlet port adjacent its other end for venting fluid from the cylinder, a bore in said piston providing a continuously open passage between said inlet and said outlet, said bore being dimensioned to restrict the flow of pilot pressure fluid so as to cause a pressure increase in said one end of the cylinder sufficient to shift the piston and said pilot valve to an advanced position, said spring means acting to return said piston and said spring to a retracted position upon interruption of the supply of pilot pressure fluid.

3. The combination with a valve having a member movable between two positions respectively effective to open and close a by-pass for a source of pressure fluid, of a pilot control for said valve comprising a pilot valve operable to control the application of pressure from said source to one end of the valve member to effect its movement selectively in either direction, actuating means for said pilot valve operable from a second source of pressure fluid independent of said first-mentioned source, said actuating means including a casing defining a cylinder, a piston slidable in said cylinder and positioned to act on said pilot valve, spring means urging the pilot valve and piston toward one end of said cylinder, said cylinder having an inlet port adjacent said one end for introduction of pressure fluid from said second source and an outlet port adjacent its other end for venting fluid from the cylinder, said casing having a bore providing a passage between opposite ends of said cylinder for the continuous flow of pilot pressure fluid from the inlet to the outlet, means in said bore defining an orifice dimensioned to restrict such fluid flow so as to cause a pressure increase in said one end of the cylinder sufficient to shift the piston and said pilot valve to an advanced position, said spring means acting to return said piston and said pilot valve to a retracted position upon interruption of the supply of pilot pressure fluid.

4. A by-pass valve comprising, in combination, a valve body having an inlet for fluid under pressure and an exhaust outlet connected by a passage, a movable valve member for opening and closing said passage, said valve member having areas at opposite ends adapted to be subjected to the pressure of the fluid at said inlet, said valve member having a vent passage, a movable pilot valve element positioned to co-operate with said vent passage, said valve element when moved in a direction to open said vent passage acting to unbalance the pressure at the opposite ends of the valve member and thereby initiate a following movement of the member toward the element under the urging of the pressure fluid at said inlet to close the vent passage, and means for progressively varying the position of said valve element to regulate the extent of movement of said valve member and the degree of opening of said passage including a cylinder having an inlet port for pilot pressure fluid and an outlet port adjacent opposite ends, and a piston in said cylinder co-operating with said valve element, the ends of said cylinder being connected by a restricted passage having an effective area such that the movement of the element is proportioned to changes in the rate of flow of pilot pressure fluid through said inlet port.

5. In a by-pass valve having a body with an inlet for fluid under pressure, an exhaust outlet and a movable valve member controlling communication between the inlet and the outlet, actuating means for said movable member comprising a cylinder in said valve body having inlet and outlet ports adjacent opposite ends, a piston having a working fit in said cylinder, said piston having a portion of reduced diameter at one end, and orifices formed in the piston providing continuous communication between the ends of said cylinder, said orifices opening through the reduced portion of said piston substantially spaced from the end thereof whereby direct access to the orifices by particles by foreign material is precluded.

6. A valve for by-passing pressure fluid from a source of primary supply comprising, in combination, a valve body having a bore, a member dividing said bore into two chambers, one of which constitutes a pilot cylinder, a piston reciprocable in said cylinder, said cylinder having inlet and exhaust ports opening at opposite sides of said piston, means defining a passage of restricted area opening to the cylinder at opposite sides of said piston, means defining inlet and outlet passages in said valve body for fluid from said primary source, said pressure inlet and outlet passages being connected by a passage in the valve body alined with the other of said chambers, a valve member slidable in said other chamber into and out of closing relation to said connecting passage, means defining a restricted passage connecting said primary inlet with the inner end of said other chamber for admitting primary pressure fluid thereto to balance the pressure exerted on the valve member by the fluid at the primary inlet, said valve member having a longitudinal bore of substantially greater effective area than said restricted passage extending from the inner end of said other chamber to the primary outlet passage, a pilot valve member slidable through said bore dividing member toward and from the inner end of said longitudinal bore, said piston engaging said pilot valve member in its pressure stroke to shift the member to a position to close said longitudinal bore and thereby trap fluid in the inner end of said other chamber above said valve member to maintain a pressure balance on the valve member, and a spring acting on said pilot valve member operative upon the interruption of the fluid supply to said cylinder for shifting the pilot valve member to open said longitudinal bore and thereby relieve the pressure on the inner end of said valve member to initiate its movement to open position.

7. A valve as defined in claim 6 in which the valve body is formed with a pair of passages opening into the pilot cylinder and spaced apart so that the piston in the cylinder uncovers one passage to establish communication between that passage and the cylinder inlet port as the piston approaches one end of its stroke and uncovers the other passage to establish communication between it and the cylinder exhaust port as the piston approaches the other end of its stroke.

References Cited in the file of this patent

UNITED STATES PATENTS

| | | |
|---|---|---|
| 624,890 | Batchelor | May 9, 1899 |
| 931,228 | Schutte | Aug. 17, 1909 |
| 1,071,777 | Murphy | Sept. 2, 1913 |
| 2,426,065 | Stevens | Aug. 19, 1947 |
| 2,496,553 | Littlefield | Feb. 7, 1950 |
| 2,526,646 | Ericson | Oct. 24, 1950 |
| 2,612,838 | Nichols | Oct. 7, 1952 |
| 2,664,102 | Coberly | Dec. 29, 1953 |

UNITED STATES PATENT OFFICE

CERTIFICATE OF CORRECTION

Patent No. 2,805,038 September 3, 1957

Frank Hathorn Towler et al.

It is hereby certified that error appears in the printed specification of the above numbered patent requiring correction and that the said Letters Patent should read as corrected below.

Column 4, line 42, for "throughout" read -- through --; same line, for "orifice" read -- orifices --; column 5, lines 53, 65 and 67, for "commerce", each occurrence, read -- commence --; column 8, line 17, for "particles by" read -- particles of --.

Signed and sealed this 29th day of October 1957.

(SEAL)
Attest:

KARL H. AXLINE
Attesting Officer

ROBERT C. WATSON
Commissioner of Patents